L. A. SPRAGUE.
TRACTOR ATTACHMENT FOR MOTOR VEHICLES.
APPLICATION FILED DEC. 17, 1917.

1,384,164.

Patented July 12, 1921.
2 SHEETS—SHEET 1.

INVENTOR
Leo A. Sprague

BY
Parsons & Parsons
ATTORNEYS

UNITED STATES PATENT OFFICE.

LEO ALMONT SPRAGUE, OF HENDERSON, NEW YORK.

TRACTOR ATTACHMENT FOR MOTOR-VEHICLES.

1,384,164.　　　　　Specification of Letters Patent.　　Patented July 12, 1921.

Application filed December 17, 1917. Serial No. 207,590.

*To all whom it may concern:*

Be it known that I, LEO A. SPRAGUE, a citizen of the United States, and a resident of Henderson, in the county of Jefferson and State of New York, have invented a certain new and useful Tractor Attachment for Motor-Vehicles, of which the following is a specification.

This invention relates to motor tractors, and has for its object a particularly simple and efficient tractor construction by means of which the tractor wheels can be interchangeably mounted with the regular drive wheels on the live axles of a motor vehicle; and the invention consists in the novel features and in the combinations and constructions hereinafter set forth and claimed.

In describing this invention reference is had to the accompanying drawings in which like characters designate corresponding parts in all the views.

Figure 1:
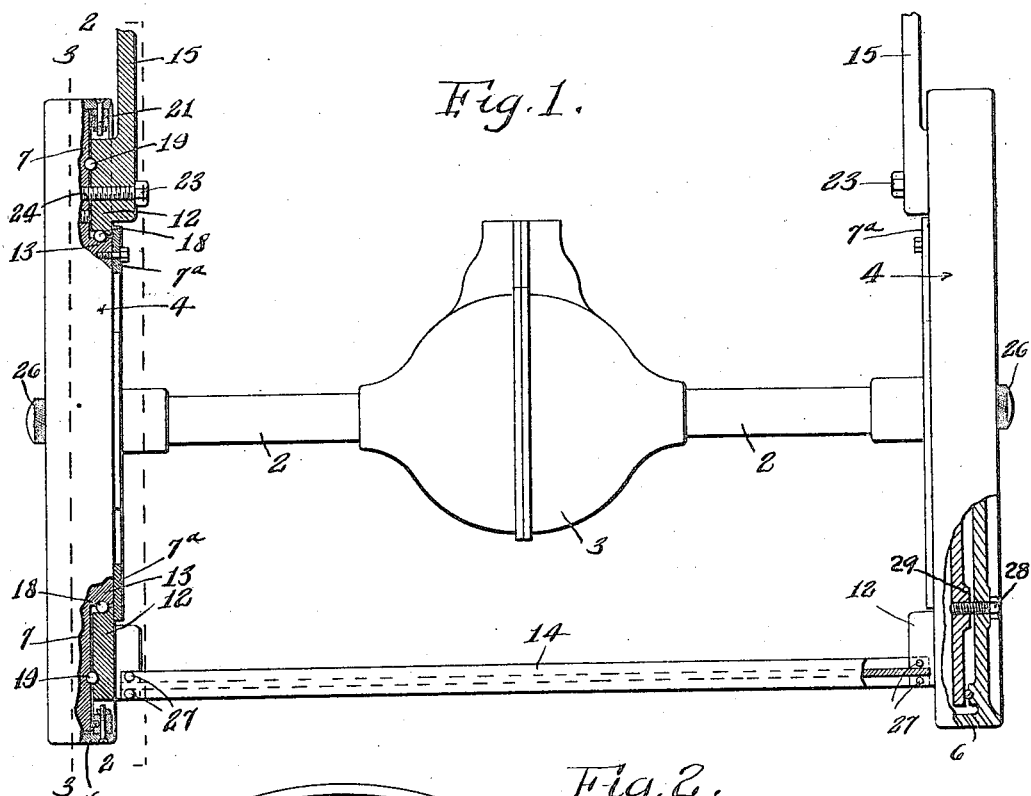
Figure 1 is a plan view, partly in section of my invention showing the same applied to the rear axle of a motor car.
Figure 2:
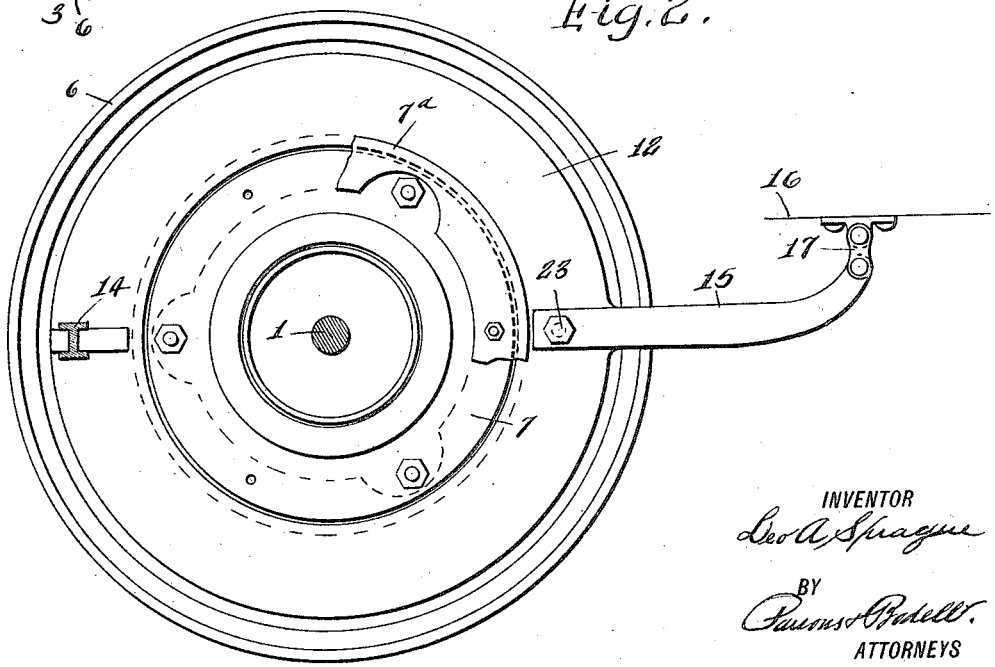
Fig. 2 is a sectional view taken on the plane of line 2—2, Fig. 1.
Figure 3:
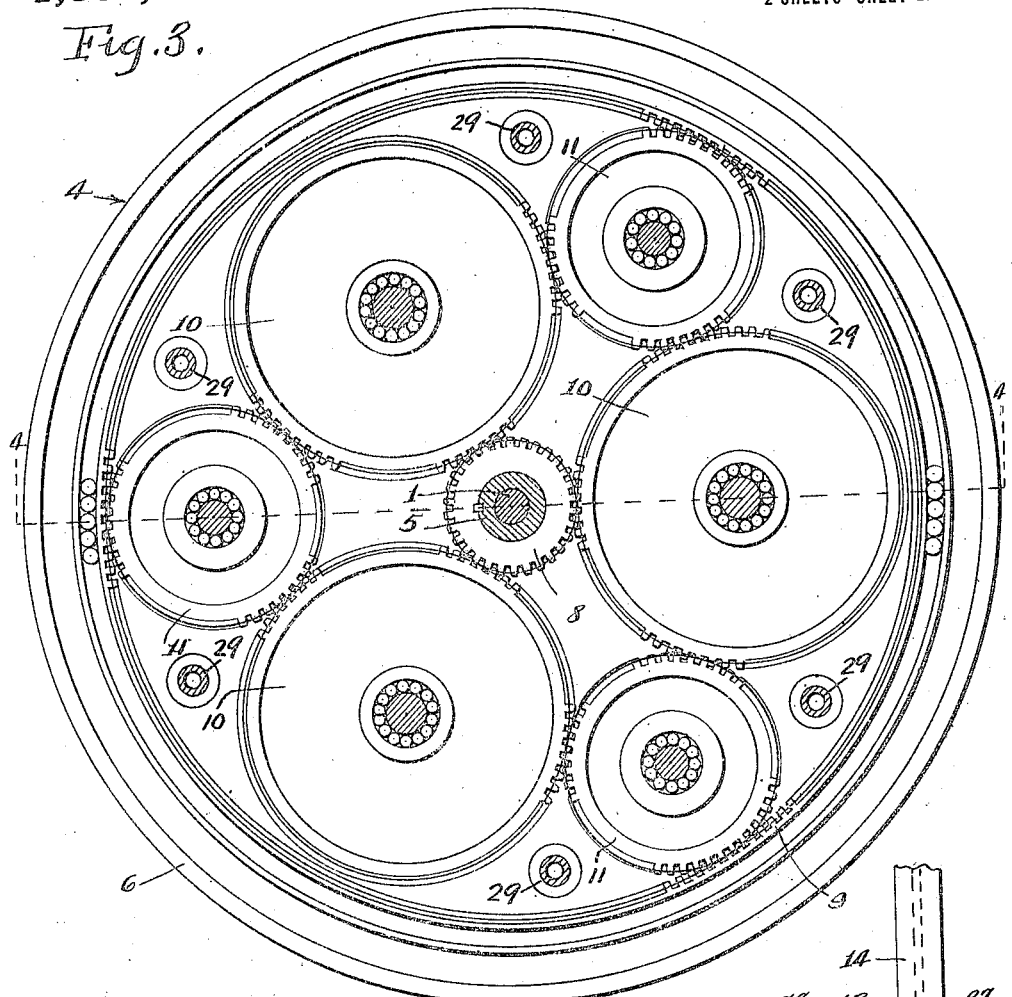
Fig. 3 is an enlarged sectional view taken on the plane of line 3—3, Fig. 1.
Figure 4:
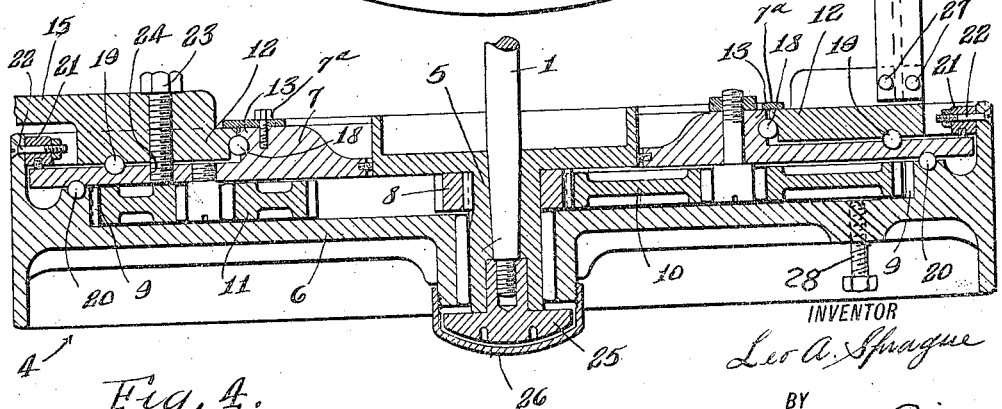
Fig. 4 is a sectional view on line 4—4, Fig. 3.

This tractor attachment comprises wheel units each of which is interchangeably mountable with the regular drive wheel on the live axle of a motor car and comprises reducing gearing by means of which the rim of the wheel may be rotated in the same direction but at less speed than the axle or may be rotated as a unit with the axle.

1 designates one of the axles of a motor vehicle upon which the rear wheel is mounted, the axles being located in the usual manner in casings 2 and connected at their inner ends by the usual differential gearing located within the casing 3.

4 designates the wheel units mounted upon the axles 1 located within the casing 2.

Each unit comprises a hub 5 mounted on the axle 1 to rotate therewith, a wheel 6 loosely mounted on the hub 5, reducing gearing between the hub 5 and the wheel 6 to transmit the motion of the hub to the wheel 6 in the same direction that the hub is rotating, a gear carrier 7 concentric with the axle and carrying a part of said gears, and means for normally holding the gear carrier 7 from rotation so that the wheel 6 is driven from the hub 5 through the reducing gears, said means being operable to release the gear carrier so that it rotates with the axle 1 and the wheel 6 rotates as a unit with the hub 5. The gearing also includes an arrangement of gears which transmits the motion from the hub 5 to the wheel 6 along radii spaced substantially equidistances apart.

The gearing of each unit comprises a driving gear 8 mounted on the hub 5, an internal gear 9 associated with the rim of each wheel 6 and gearing between the gears 8 and 9 including idlers 10 meshing with the driving gear 8 at points spaced equidistances apart, and pinions 11 meshing with the internal gear 9 at points spaced equidistances apart, each pinion 11 also meshing with two of the idlers 10, said idlers 10 meshing on opposite sides of their axis with two of said pinions 11. Each idler 10 is thus common to two trains of gears and said idlers serve to equalize the transmission of motion from the driving gear 8 to the internal gear 9 and to distribute the force equally throughout the internal gear 8 and also to distribute the pull or drag of the tractor attachment from the gear carrier to the axle through said gearing equally along radial lines spaced equidistances apart.

The tractor attachment as here shown coacts with the gear carriers so that the pull of the trailer is transmitted through the gear carriers and driving gear to the hubs 5 and axles 1, and owing to the arrangement of gears carried by the gear carriers 7, the pull of the trailer is transmitted equally in all radial directions to the axle 1 and hence does not retard the rotation of the axle more at one point circumferentially of the axle than at another.

This trailer attachment comprises members as rings 12 mounted on hubs 13 on the gear carriers 7, a bar 14 connecting the rings, and radius rods 15 connecting the rings to the vehicle frame 16 through suitable shackles 17. Suitable journal and thrust bearings 18 and 19 are interposed between the rings 12 and the gear carriers 7 and also suitable bearings 20 are interposed between the carriers 7 and the wheels 6. Each carrier is held in position by a retaining ring 21 suitably secured as by screws 22 to the rim of the companion wheel 6.

The means for normally holding the carriers from rotation acts to couple the carriers 7 to the rings 12 and as here shown, this means is a screw bolt 23 threading through the ring 12 and into any one of a number of holes 24 in each carrier. When the carriers are held from rotation by the screws 23, the wheels 6 are driven through the reducing gears 8, 10, 11 and 9. When the carriers 7 are released by withdrawing the screws 23 out of the holes 24, the wheels 6, hubs 5 and gear carriers 7 rotate as a unit.

To cause the wheel 6, its hub 5 and companion gear carrier 7 to rotate as a unit, means is provided for locking them together. This means as here shown consists of one or more screws 28 which pass transversely through the web of the wheel 6 and into the gear carrier 7 or openings 29 therein. These screws are preferably spaced equidistant around the web of the wheel and the gear carrier. When the screws 23 are used to hold the carriers from rotation the screws 28 are removed and vice versa.

This tractor attachment is particularly advantageous in that it can be substituted for the regular driving wheels of motor vehicles, and when the tractor is used to carry or draw a heavy load, the wheels 6 are actuated through the reducing gearing and when unloaded the vehicle may be driven directly from the axles 5 at the same speed it could be driven with the ordinary wheels thereon.

In applying my tractor attachment to a motor vehicle, the ordinary driving wheels are removed and my units applied to the axles, they being secured to the axles by the same or similar nuts 25 and caps 26 as those employed with the usual wheels. The bar 14 which had been previously disconnected from one of the wheels by removing one or the other set of bolts 27, is again attached to the wheel by replacing said bolts 27, and the shackles 17 at the ends of the radius rods are secured to the bearings therefor previously attached to the vehicle frame.

What I claim is:

1. In a tractor wheel unit of the class described, the combination of a hub, a driving gear mounted thereon, a wheel loosely mounted on the hub and formed with an internal annular gear opposed to the driving gear, a gear carrier concentric with the hub, and trains of gears mounted on the carrier and including gears meshing with the driving gear and other gears meshing with the internal gear at points spaced apart, the trains having gears in common, substantially as and for the purpose described.

2. In a tractor wheel unit of the class described, the combination of a hub, a driving gear mounted thereon, a wheel loosely mounted on the hub and formed with an internal annular gear opposed to the driving gear, a gear carrier concentric with the hub, intermediate gears mounted on the carrier and meshing with the driving gear and pinions carried by the gear carrier and meshing with the internal gear and with two of the intermediate gears, each intermediate gear meshing on opposite sides of its axis with two of said pinions, substantially as and for the purpose specified.

3. In a tractor wheel of the class described, the combination of a hub, a driving gear mounted thereon, a wheel loosely mounted on the hub and formed with an internal annular gear opposed to the driving gear, gears carried by the gear carrier and meshing with the driving gear at points spaced equidistant apart, pinions, each meshing with the internal gear and with two of the intermediate gears, each intermediate gear meshing on opposite sides of its axis with two of said pinions, means for normally holding the gear carrier from rotation with the wheel and operable to release the gear carrier from holding action whereby the carrier rotates with the wheel, and means for locking the wheel and the gear carrier together, substantially as and for the purpose described.

4. A tractor comprising a pair of tractor wheel units, each including a driving hub, a wheel rotatable relatively to the hub, a train of gears between the hub and the wheel, a gear carrier concentric with the wheel and supporting said train of gears, a trailer attachment including non-rotatable rings mounted on the gear carriers, and a bar connecting the rings, substantially as and for the purpose set forth.

5. A tractor comprising a pair of tractor wheel units, each including a driving hub, a train of gears between the hub and the wheel, a gear carrier concentric with the wheel and supporting said train of gears, and a trailer attachment including non-rotatable rings mounted on the gear carriers, a bar connecting the rings, and radius rods extending from the rings and being connected to the body of the trailer, substantially as and for the purpose described.

6. A tractor comprising a pair of tractor wheel units, each including a driving hub, a wheel rotatable relatively to the hub, a train of gears between the hub and the wheel, a gear carrier concentric with the wheel and supporting said train of gears, a trailer attachment including non-rotatable rings mounted on the gear carriers, and a bar connecting the rings, and means for detachably securing the rings to the gear carrier to normally prevent rotation of the gear carrier, substantially as and for the purpose specified.

7. In a tractor construction, the combination of live axles, hubs mounted on the axles, driving gears mounted on the hubs respectively, wheels loosely mounted on the hubs and having internal gears opposed to the driving gears, gear carriers mounted on the axles concentric with the hubs, a plurality of trains of gears between each driving gear and internal gear and arranged to engage the internal gear at points spaced substantially equidistances apart, the trains of gears associated with each wheel having intermediate members in common, and a trailer attachment comprising non-rotatable rings mounted on the gear carriers, and a bar connecting the rings, substantially as and for the purpose set forth.

8. In a tractor construction the combination of live axles, hubs mounted on the axles and having driving gears thereon, wheels loosely mounted on the hubs and having internal gears, gear carriers mounted concentric with the hubs, a trailer attachment connected to the gear carriers, and trains of gears mounted on the carriers between the driving gears and the internal gears arranged to transmit and distribute force radially between the driving gears and the internal gears and from the carriers to the hubs along radial lines spaced substantially equidistances apart, substantially as and for the purpose described.

In testimony whereof, I have hereunto signed my name, at Henderson, in the county of Jefferson and State of New York, this 3d day of Nov., 1917.

LEO ALMONT SPRAGUE.